Figure 1:
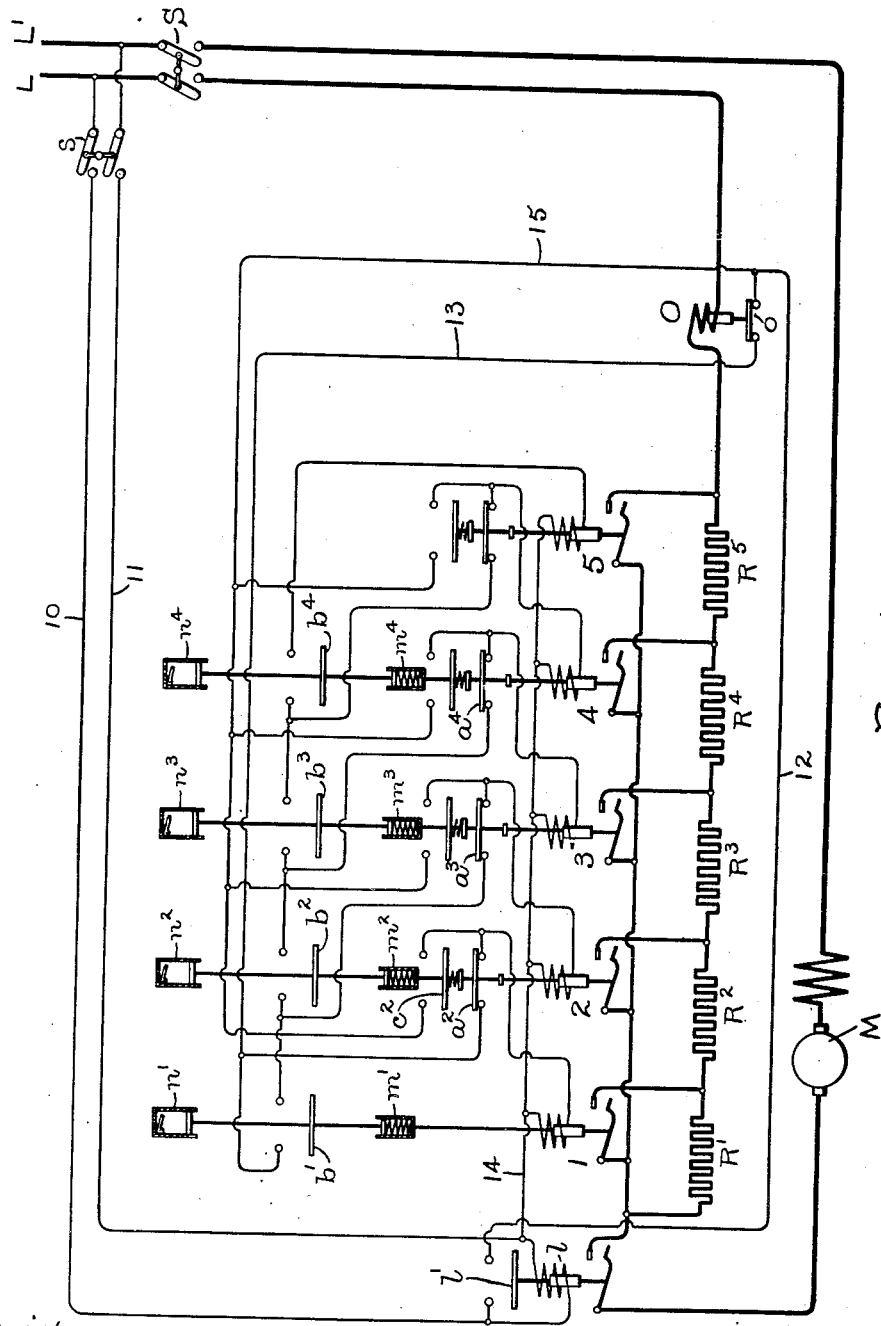

H. E. WHITE.
SYSTEM OF MOTOR CONTROL.
APPLICATION FILED MAY 18, 1908.

969,583.

Patented Sept. 6, 1910.
3 SHEETS—SHEET 1.

Witnesses
Lester H. Fulmer
J. Ellis Glen

Inventor
Harold E. White
by Albert H. Davis
Atty.

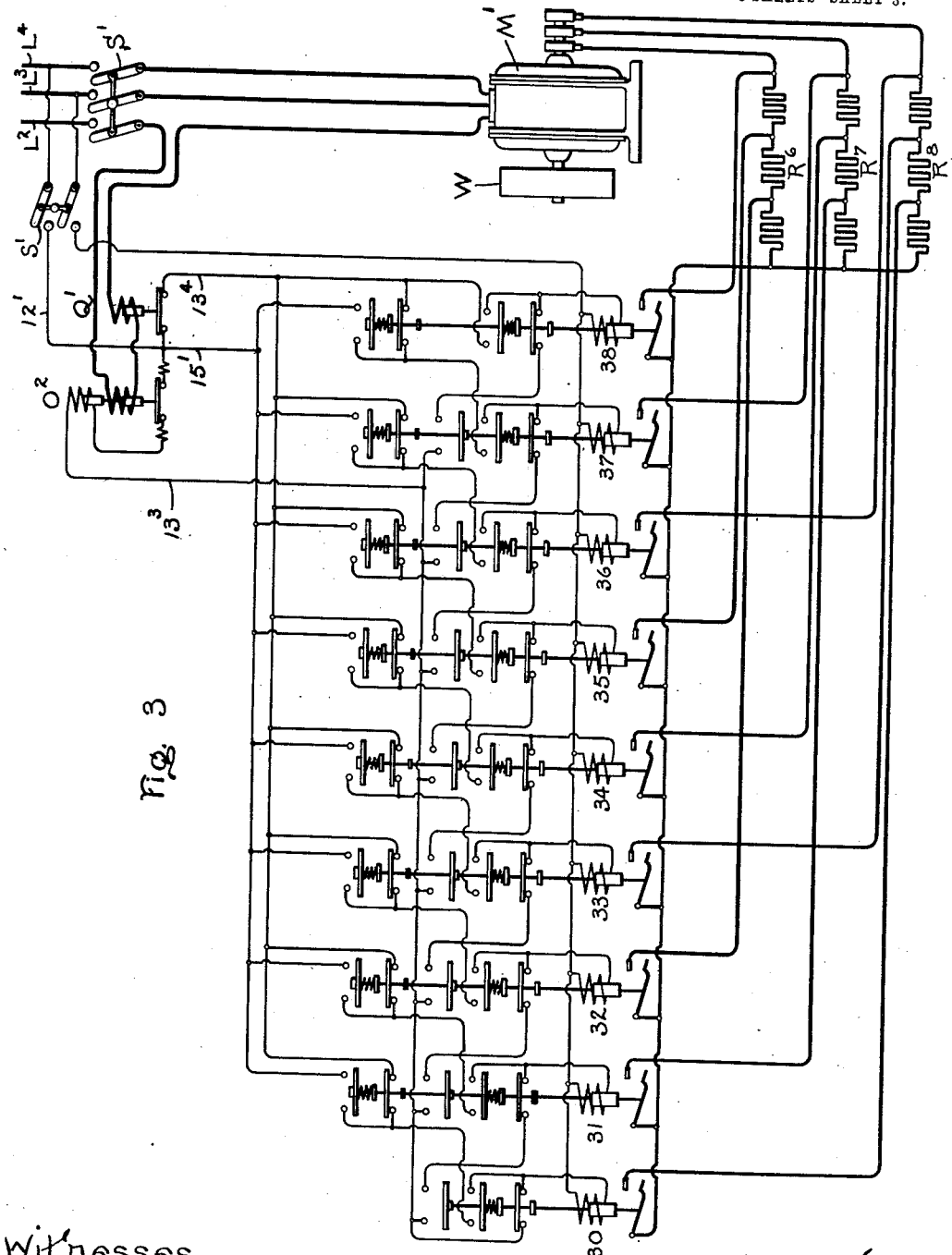

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

SYSTEM OF MOTOR CONTROL.

969,583.      Specification of Letters Patent.      Patented Sept. 6, 1910.

Application filed May 18, 1908. Serial No. 433,381.

*To all whom it may concern:*

Be it known that I, HAROLD E. WHITE, a citizen of the United States, residing at Schenectady, county of Schenectady, State of New York, have invented certain new and useful Improvements in Systems of Motor Control, of which the following is a specification.

My invention relates to the control of electrical apparatus and is particularly useful in connection with the starting and the regulation of the speed of electric motors.

In systems of motor control in which a plurality of electrically controlled switches are employed to effect the necessary connections of the motor circuit, and more particularly to regulate the current supplied to the motor or motors in starting, it is desirable that means should be provided for insuring against application to the motor or motors of a larger current than they can safely stand.

It is an object of my invention to provide an improved system of motor control in which furnishing to the motor of a dangerously large current is prevented automatically, without interrupting the motor circuit, not only in starting but also after the motor has been brought to its full speed.

More particularly stated, my invention consists in providing an improved system of motor control in which the controlling switches operate in succession to control the current applied not only in starting but also at all times during operation. In other words, in my system of control, hereinafter described, the controlling switches close and open automatically in succession under the control, in an improved manner, of an overload responsive device, and regulate the current supplied to the motor. More briefly stated, by the use of my invention an improved control system is provided in which both "notching-up" and "notching-down" takes place automatically under the control of an overload responsive device.

In motor control systems heretofore known and used various arrangements have been employed to insure a certain minimum interval of time between the operation of successive controlling switches. For example, auxiliary switches, operated by each of the electrically controlled switches, have been arranged to complete the actuating circuit for the next succeeding switch, the desired time interval being given by providing in some way for delayed operation of each auxiliary switch after the switch by which it is operated has closed. Such an arrangement is shown in the patents to Hill, Nos. 778,242 and 778,825 dated December 27, 1904. The desired time interval between the operation of successive switches has also been provided for by interposing in the actuating circuit for the switches a so-called "notching relay," the coil and contacts of which are connected in series with the actuating circuit, this relay being so arranged that it will operate immediately after the operation of each switch and will temporarily interrupt the actuating circuit before the succeeding switch has time to close. Systems of control operated on this principle are well-known and are shown in many patents, for example, in the patent to Hill, No. 798,342, dated August 29, 1905. It has been customary in systems of the kinds just mentioned, to provide means for interrupting the actuating circuit for the series of switches if at any time the current in the motor circuit exceeds a certain value, this being accomplished in the first of the above mentioned arrangements by a simple overload relay and in the second arrangement by providing on the notching relay a holding coil, connected in the motor circuit, which serves to hold the core of the notching relay in its raised position as long as the motor current exceeds a certain value.

My improved system of control is not confined in its application to the systems of control mentioned above but, as will be obvious to those skilled in the art, may be introduced into many other arrangements. I have, however, for the purpose of illustration shown it as embodied in systems similar to those above referred to as to the arrangements for insuring a time interval between the operation of successive switches.

My invention will be understood from the following description taken in connection with the drawings in which—

Figure 2:
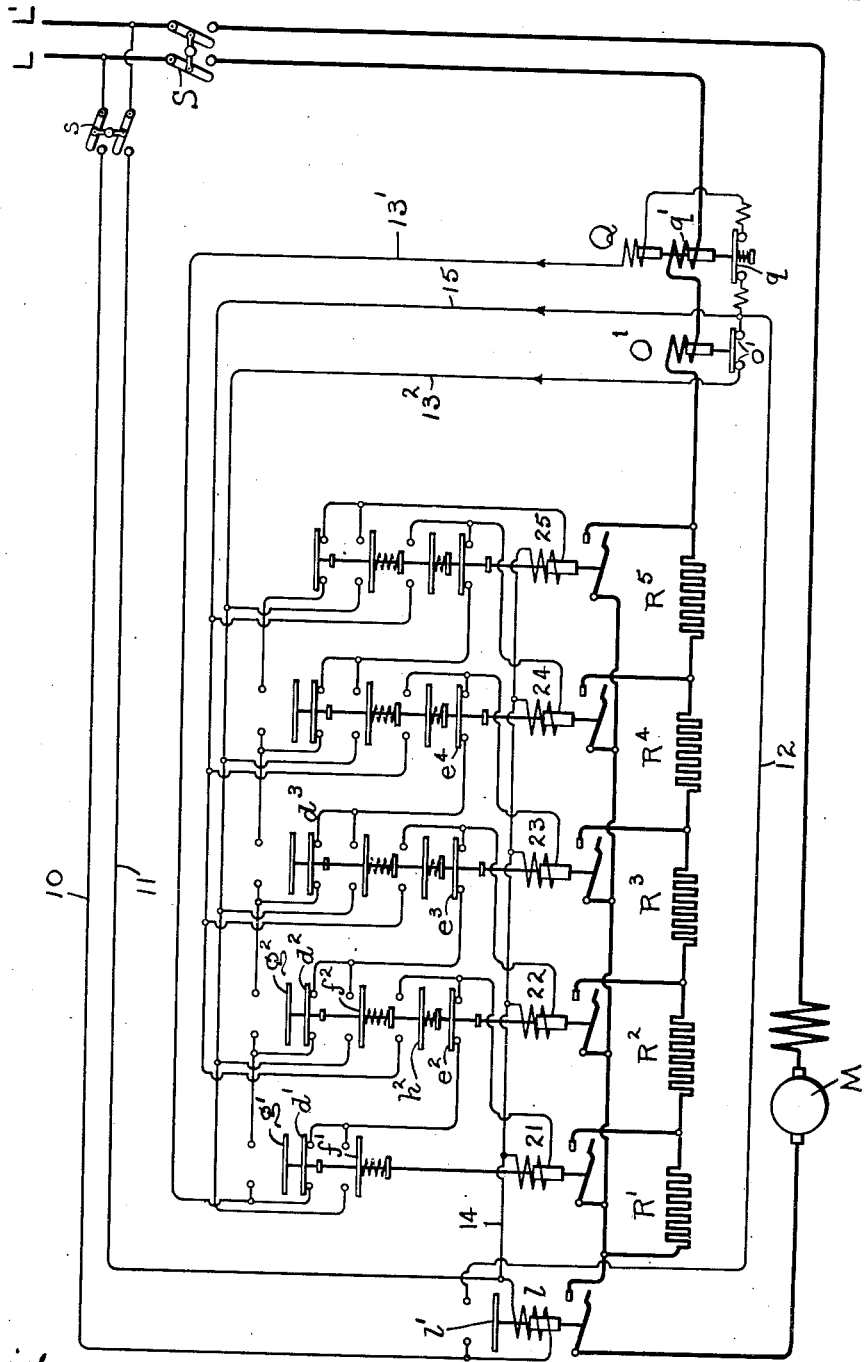

Figure 1 illustrates diagrammatically my invention as applied to an automatic control system for a direct current motor in which a time interval between the operation of successive switches is given by means of delayed operation of the auxiliary switches as referred to above: Fig. 2 is a system similar to that of Fig. 1 but provided with a "notching relay" which furnishes a time and current limit between the operation of successive switches, and Fig. 3 illustrates the system of Fig. 2 applied to an alternating current induction motor.

Referring to Fig. 1, L, L' indicate a source of direct current from which through a switch S current may be supplied to the motor M, in this case series wound, although it might obviously equally well be of any other type. The motor circuit is completed by a line switch $l$ and sections of resistance $R^1$, $R^2$, $R^3$, $R^4$, and $R^5$ are arranged to be cut out or inserted in the motor circuit by electrically controlled switches 1, 2, 3, 4 and 5. An overload relay, O, of any well known form, the manner of operation of which is hereinafter described, is shown with its actuating coil connected in the motor circuit and the contacts controlled by it interposed in one of the control circuits. Current for the control of the switches $l$ and 1 to 5 inclusive is taken from the source L, L', through a switch $s$. Each of the electrically controlled switches 1 to 4 inclusive is shown in a diagrammatic way as provided with auxiliary switches arranged to close or open certain control circuits after the closing of the main contacts. The auxiliary switches may be of any well-known form and, for example, may comprise metal disks mounted upon rods which by their longitudinal movement move the disks into and out of engagement with fixed contacts. The disks may be secured to the rod or free to move thereon under the control of springs and collars fixed on the rods in a well-known manner. The auxiliary switches, $b^1$, $b^2$, etc., which control the actuating circuit for the next succeeding switch are arranged to close a certain interval of time after the closing of their respective switches by means of spring connections $m^1$, $m^2$, etc., and dash pots, $n^1$, $n^2$, etc., substantially in the manner shown in the patents to Hill Nos. 778,242 and 778,825, above mentioned. Arrangements of this kind are well-known to those skilled in this art and since they form no part of my invention need not be described more in detail. The arrangement of the control circuits and the order of operation of the auxiliary switches controlled by the electro-magnetically controlled switches $l$ and 1 to 5 inclusive can best be set forth in connection with the operation of the system as a whole, which will now be described.

In the system of control illustrated in Fig. 1, assuming that the switches S and $s$ are closed, current will flow from the line L, through the wire 10 and the actuating coil of the switch $l$, through the wire 11 and switch $s$, to the source L'. The line switch $l$ will, therefore, close and the motor will be connected to the source in series with all the resistance $R^1$, $R^2$, etc. The line switch $l$ in closing closes an auxiliary switch $l'$, thereby completing a circuit from the source L, through wire 10, switch $l'$, wire 12, contacts $o$ of overload relay O, wire 13, through auxiliary switch $a^2$ controlled by switch 2, then through the actuating coil of the switch 1, through wires 14 and 11 and switch $s$ to the source L'. The switch 1 will therefore, close, short-circuiting the resistance $R^1$ and in closing will place under compression the spring in the spring connection $m^1$, thereby causing the auxiliary switch $b^1$ to close after a certain interval of time depending upon the retarding effect of the dash pot $n^1$. Closing of the auxiliary switch $b^1$ completes a circuit from the wire 13, through switch $b^1$, through auxiliary switch $a^3$ on the switch 3 to and through the actuating coil of the switch 2, through wires 14 and 11 to the source L'. Switch 2 will then close, short-circuiting the resistance $R^2$, and in closing will close auxiliary switch $c^2$, and open auxiliary switch $a^2$ and also after a certain interval of time as in the case of switch 1 above described, will close auxiliary switch $b^2$. Closing of auxiliary switch $c^2$ completes a circuit directly from the wire 12, through wire 15, switch $c^2$ to the actuating coil of switch 1, thereby providing a maintaining circuit for this switch independent of the contacts of the relay O. Opening of switch $a^2$ interrupts the connection of the actuating coil of switch 1 with the wire 13, which serves both as an actuating and a first or temporary maintaining circuit. Closing of switch $b^2$ completes a circuit from the wire 13, through switch $b^1$, switch $a^4$ of switch 4, and through the actuating coil of switch 3, and through wires 14 and 11 to the source of current thereby causing the switch 3 to close, which in closing shifts the actuating coil of switch 2 from wire 13 to wire 15, and after a certain interval of time connects the next succeeding switch to the wire 13. In this way the switches 1 to 5 inclusive if unaffected by the relay O, will close in regular order with a certain interval of time between their successive closing. If at any time during the operation above described, or in fact, if after all the switches 1 to 5 inclusive have closed, the current in the motor circuit exceeds a certain value corresponding to that for which the relay O is designed, the relay O will pull up, opening its contacts $o$ and interrupting the connection of the wire 13 with wire 12 leading to the source. Interruption of the circuit through the wire 13 results, as will be clear from the drawing, in deënergizing the actuating coil of the electrically controlled switch last operated which relies on this wire for its supply of current. The last switch closed will, therefore, open and reinsert in the motor circuit the resistance controlled by it. At the same time the auxiliary switches controlled by that switch will return to the position shown in the drawing thereby shifting the actuating coil of the preceding switch from connection with the wire 15 to connection with the wire 13. If the reinsertion in the motor circuit of the section of resistance controlled by the first switch to open is insufficient to cut down the current to a low enough value to cause the relay O to drop, the preceding switch will also open and this successive opening in reverse order of the switches 1 to 5 will continue as long as the relay O remains up. As soon as the relay O drops, owing to the decrease of current in the motor circuit, successive closing of the switches 1 to 5 will immediately commence and continue under the control of the relay O. In this way "notching-up" and "notching-down" will take place automatically under the control of the relay O and overload of the motor beyond a certain point will be effectively prevented.

The system of Fig. 2 is similar to that of Fig. 1 except that the time interval between the successive operation of the electrically controlled switches is provided for by means of a notching relay Q, of well known form, instead of by means of the slow closing auxiliary switches $b^1$, $b^2$, etc., of the system of Fig. 1. In Fig. 2 the main switches S, s, line switch l, auxiliary switch l', operated by the line switch, wires 10, 11, 12 and 14, motor M and resistances $R^1$, $R^2$, etc., correspond to the elements referred to by the same characters in Fig. 1; and switches 21 to 25 inclusive correspond to switches 1 to 5 inclusive of Fig. 1 and serve to short-circuit the resistance sections $R^1$, $R^2$, etc. The overload relay $O^1$ corresponds to the overload relay O of Fig. 1 and serves, as hereinafter described, to cause opening of the switches 21 to 25 inclusive in reverse order upon the occurrence of an overload in a manner similar to that in which the relay O of Fig. 1 operates. The auxiliary switches controlled by the switches 21 to 25 inclusive are shown as being of the well known disk type similar to those of the switches 1 to 5 inclusive of Fig. 1 described above.

Operation of the system shown in Fig. 2 is as follows: Assuming that the switches S and s are closed, the line switch l will be closed as in the case of the system of Fig. 1 and the wire 12 will be connected to the source through the auxiliary switch l'. Current passes from the wire 12, through the magnetic snap-action contacts q of the notching relay Q, through the actuating coil of this relay to the wire 13', thence through auxiliary switch $d^1$ on the switch 21, through auxiliary switch $e^2$ on switch 22, through the actuating coil of switch 21, and through wires 14 and 11 to the source. The switch 21 will, therefore, close and, in doing so, closes auxiliary switch $f^1$, opens auxiliary switch $d^1$ and closes auxiliary switch $g^1$. Closing of switch $f^1$ and opening of switch $d^1$ results in shifting the connection of the actuating coil of the switch 21 from the wire $13^1$ to the wire $13^2$ which is connected to the wire 12 through the contacts $o^1$ controlled by the relay $O^1$. Closing of the switch $g^1$ completes a circuit from the wire $13^1$, through auxiliary switch $d^2$ of switch 22, through auxiliary switch $e^3$ of switch 23, through the actuating coil of switch 22, and thence through the wires 14 and 11 to the source. The switch 22, is however, prevented from immediately closing by the notching relay Q which, in the usual manner, pulls up immediately after the closing of switch 21 and maintains interrupted the circuit through the wire $13^1$ as long as the motor current in its holding coil, $q^1$ is sufficient to hold the core of the relay raised. When, however, the relay Q drops and closes its contacts q, the switch 22 closes and, in doing so, closes auxiliary switch $f^2$, opens switch $d^2$, closes switch $h^2$, opens switch $e^2$ and closes switch $g^2$. Closing of switch $f^2$ and opening of switch $d^2$ results in shifting the connection of the actuating coil of switch 22 from the wire $13^1$, through the switches $g^1$ and $d^2$, to the wire $13^2$ through the switch $f^2$. Closing of switch $h^2$ and opening of switch $e^2$ shift the actuating coil of the switch 21 from connection with the wire $13^2$ through switches $f^1$ and $e^2$, to connection with the wire 15 which is connected directly to the wire 12. Closing of the switch $g^2$ completes a connection for the actuating coil of the switch 23 with the wire $13^1$ through switches $g^1$, $g^2$, $d^3$ and $e^4$. Under this condition the actuating coil of the switch 21 is maintained energized from the wire 15 independently of the overload relay $O^1$, the actuating coil of the switch 22 is supplied with current from the wire $13^2$ through the contacts of overload relay $O^1$, and the coil of the switch 23 is energized from the wire $13^1$ as soon as the notching relay Q has dropped. In this way the switches 21 to 25 inclusive, if unaffected by the overload relay $O^1$, will close in regular order, the interval between their successive closings being controlled by the notching relay Q in the usual manner. If at any time during this operation, or if after all the switches 21 to 25 inclusive have closed, the current in the motor circuit exceeds a certain value, corresponding to which the relay $O^1$ is designed, this relay will pull up opening its contacts $o^1$ and interrupting the connection of the wire $13^2$ with the wire 12 leading to the source. Interruption of the circuit through the wire $13^2$, as in the case of the interruption of the circuit through the wire 13 in the system of Fig. 1, results in deënergizing the actuating coil of the electrically controlled switch last operated which, as explained above, relies upon this wire for its supply of current. The last switch closed will, therefore, open and will reinsert in the motor circuit the resistance controlled by it. At the same time the auxiliary switches controlled by that switch will return to the position shown in the drawing, thereby shifting the actuating coil of the preceding switch from connection with the wire 15 to connection with the wire $13^2$. As in the case of the system of Fig. 1, if reinsertion in the motor circuit of the section of resistance controlled by the first switch to open is insufficient to cut down the current to a low enough value to cause the relay $O^1$ to drop, the preceding switch will also open and this successive opening in reverse order of the switches 21 to 25 inclusive will continue as long as the relay $O^1$ remains open. Also as in the case of the system of Fig. 1, as soon as the relay $O^1$ drops, owing to the decrease of current in the motor circuit, successive closing of the switches 21 to 25 will immediately commence and continue as before. It is seen therefore, that my invention as incorporated in the system of Fig. 2 is substantially the same as when incorporated in the system of Fig. 1. The wires $13^1$ and $13^2$ of Fig. 2 are the equivalent, as far as the operation of the system goes, of the wire 13 of Fig. 1. That is, wires $13^1$ and $13^2$ provide actuating and first, or temporary, maintaining circuits for the switches 21 to 25 of Fig. 2 as does the wire 13 for the switches 1 to 5 inclusive of the system of Fig. 1.

Fig. 3 shows practically the same system as that illustrated in Fig. 2 applied to the control of an induction motor, provided with a fly-wheel, W, and used to drive a variable load such, for example, as a rolling mill. In Fig. 3 the source of alternating current is indicated at $L^2$, $L^3$ and $L^4$, and a switch $S^1$ is shown for connecting the primary of the induction motor $M^1$ to said source. Points on the secondary winding of the motor $M^1$ are connected through collector rings and resistances $R^6$, $R^7$ and $R^8$ in a well-known manner, and a plurality of switches 30 to 38 inclusive are arranged to short-circuit sections of these resistances step-by-step according to a well-known method of controlling induction motors. The switch $s^1$ being closed the switches 32 to 38 inclusive receive current for their actuating coils through the wire $12^1$ and wires $13^3$, $13^4$, and $15^1$ exactly as the switches 21 to 25 inclusive receive current through the wires $13^1$, $13^2$ and 15 in the system shown in Fig. 2 above described. In the system of Fig. 3 a notching relay $O^2$ and $Q^1$ control the operation of the switches 30 to 38 inclusive, as do the relays $O^1$ and Q in the system of Fig. 2, the holding coil of notching relay $O^2$ and the actuating coil of overload relay $Q^1$ being connected in series in one of the supply lines and acting under overload conditions exactly as do the series coils of relays $O^1$ and Q in the system of Fig. 2. The relays $O^2$ and $Q^1$ should, of course, be suitably designed for operation on alternating current in a manner well understood by those skilled in the art as should also the switches 30 to 38 inclusive. If desired, however, the control circuits might be supplied with direct current and switches and relays suitable for operation on direct current might be used. The arrangement of control circuits and auxiliary switches for the electrically controlled switches 30 to 38 inclusive is not exactly the same as in the system of Fig. 2, but the results attained are the same in the two cases. This will be clear from a consideration of Fig. 3, it being understood that each switch in closing shifts its actuating coil from connection with the wire $13^3$ to connection with the wire $13^4$, that each switch except the last in closing completes the connection of the actuating coil of the succeeding switch with the wire $13^3$, and that each switch except the first in closing shifts the actuating coil of the preceding switch from connection with the wire $13^4$ to connection with the wire $15^1$. In the system of Fig. 3 therefore, if at any time the load on the motor becomes sufficient to increase the motor current to a value high enough to cause the relay $Q^1$ to pull up, the switches 30 to 38 inclusive will commence to open in reverse order and, by cutting back into the rotor circuit the sections of resistance comprising the resistances $R^6$, $R^7$ and $R^8$, will cut down the currents in the motor circuits, thereby decreasing the torque of the motor and allowing the fly-wheel to give up its energy to the load, an operation which will continue until the overload falls off and the relay $Q^1$ drops. Upon dropping of the relay $Q^1$, the switches 30 to 38 will close in succession as before.

While I have shown my invention as incorporated in certain particular systems of control, I do not wish to be understood as limiting it in its application to these except as called for by the following claims.

What I claim as new and desire to secure by Letters Patent of the United States, is,—

1. In combination, a plurality of electrically controlled switches, means for causing successive closing of said switches, means responsive to an overload arranged to coöperate with said last mentioned means to cause opening of said switches in reverse succession as long as an overload exists, and means for maintaining said overload device ineffective as to all of said switches except the last one which has closed.

2. In combination, a plurality of electrically controlled switches, a control system for operating said switches automatically in succession comprising interlocking contacts on the several switches arranged to close the circuit of each succeeding switch as the preceding switch is actuated, and means responsive to an overload for successively interrupting the circuits for the several switches in the reverse order in which they are completed.

3. In combination, a plurality of electrically controlled switches, means for causing successive closing of said switches, a first maintaining circuit for said switches, a second maintaining circuit for said switches, auxiliary switches controlled by each of said electrically controlled switches except the first for shifting the preceding switch from said first maintaining circuit to said second maintaining circuit, and an overload responsive device arranged to interrupt said first maintaining circuit upon the occurrence of an overload.

4. In combination, a plurality of electrically controlled switches, an actuating circuit for said switches, a maintaining circuit for said switches, an overload responsive device arranged to coöperate with said maintaining circuit, and means for maintaining said overload device ineffective as to all switches except the last one which has closed whereby the switches are caused to automatically close in succession when no overload exists and to open in reverse succession as long as an overload exists.

5. In combination, a plurality of electrically controlled switches, an actuating circuit for said switches, a maintaining circuit for said switches, means controlled by each switch in closing for shifting its actuating coil from said actuating to said maintaining circuit, and an overload responsive device arranged to coöperate with said maintaining circuit to cause successive opening of said switches as long as an overload exists.

6. In combination, a plurality of electrically controlled switches, an actuating circuit for said switches, a maintaining circuit for said switches, means controlled by each switch in closing for shifting its actuating coil from said actuating to said maintaining circuit, and an overload responsive device arranged to cause successive opening of said switches when an overload occurs, and means for maintaining said overload device ineffective as to all switches except the last which has closed.

7. In combination, a plurality of electrically controlled switches, control circuits therefor having actuating and maintaining branches, a maintaining circuit, auxiliary switches on the several switches arranged to shift each switch from the actuating to the maintaining branch, to complete the actuating branch for the succeeding switch and to shift the preceding switch from the maintaining branch to the maintaining circuit, and means responsive to an overload for interrupting the first named control circuits.

8. In combination, a plurality of electrically controlled switches, an actuating circuit therefor, a notching relay controlling said actuating circuit, a maintaining circuit for said switches, an overload relay controlling said maintaining circuit, means controlled by each switch in closing for shifting its actuating coil from said actuating to said maintaining circuit, a second maintaining circuit, and means controlled by each switch except the first in closing for shifting the actuating coil of the preceding switch from said first maintaining circuit to said second maintaining circuit.

9. In combination, a plurality of electrically controlled switches, an actuating circuit for said switches, an overload responsive device arranged to interrupt said actuating circuit when an overload occurs, a maintaining circuit for said switches, means controlled by each switch in closing for shifting its actuating coil from said actuating to said maintaining circuit, and a second overload responsive device set to operate at a greater overload than the first named overload responsive device and arranged to coöperate with said maintaining circuit to cause successive opening of said switches in reverse succession.

10. In combination, a plurality of electrically controlled switches, an actuating circuit for said switches, an overload responsive device arranged to interrupt said actuating circuit and stop the successive closing of said switches as long as an overload exists, a maintaining circuit for said switches, means controlled by each switch in closing for shifting its actuating coil from said actuating to said maintaining circuit, and a second overload responsive device set to operate upon the occurrence of a greater overload than that necessary to operate the first mentioned overload responsive device and arranged to coöperate with said maintaining circuit to cause successive opening of said switches in reverse succession as long as the overload at which the second overload responsive device operates exists.

In witness whereof, I have hereunto set my hand this 15th day of May, 1908.

HAROLD E. WHITE.

Witnesses:
BENJAMIN B. HULL,
HELEN ORFORD.